June 15, 1965

J. R. BROWN 3,189,102

IMPLEMENT CULTIVATING SHANK MOUNTING

Filed April 20, 1964

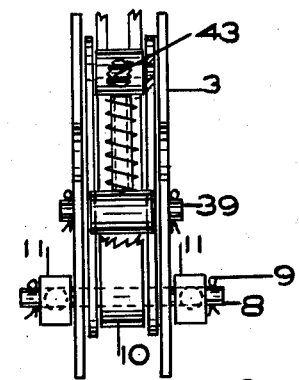
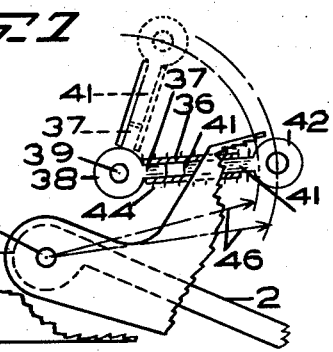
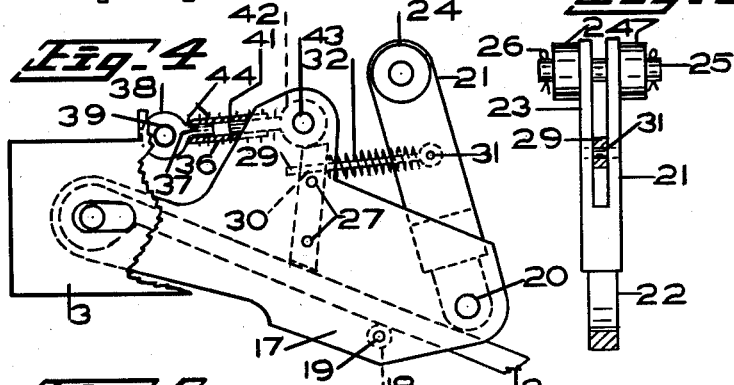
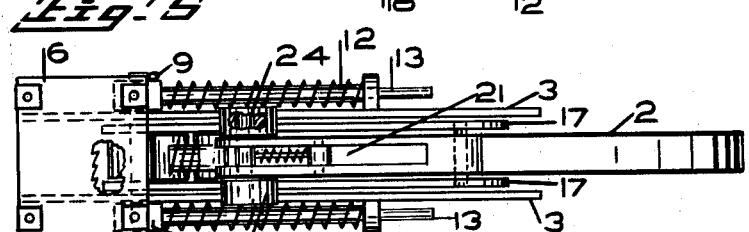
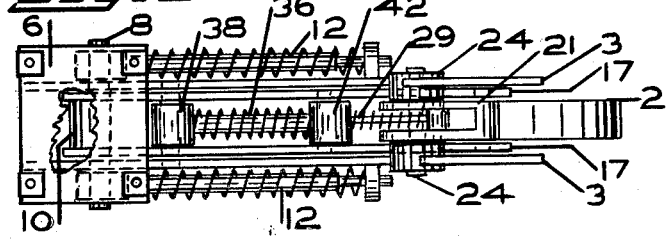

3,189,102
IMPLEMENT CULTIVATING SHANK MOUNTING
John Roy Brown, 217 Roslyn Ave., Yorkton,
Saskatchewan, Canada
Filed Apr. 20, 1964, Ser. No. 361,027
6 Claims. (Cl. 172—266)

This invention relates to mountings for the shanks of soil cultivating implements, having particular reference to a mounting in which the shank is held against rising unless a major obstruction is encountered by the shank.

In the art to which the invention relates, even depth of penetration of the cultivating feed of an implement, more particularly in seeding, is desirable to secure uniform maturing of the seeded grain. Ordinarily the shanks in such implements are spring held in working relation to the soil, allowing the shank to rise when an obstruction is encountered. In this arrangement minor variations in the depth of penetration in the soil of the cultivating elements may result with resulting uneven depth of seeding.

The present invention is concerned with eliminating these minor variations in penetration of the soil working elements by provision of locking means for the cultivator shanks that allow a limited backward movement of the shanks when encountering minor obstructions, but permit the shanks to rise when a major obstruction is encountered.

Other features and advantages of the invention will become apparent by reference to the accompanying description taken in conjunction with the drawings.

In the drawings, wherein is illustrated a preferred embodiment of the invention, FIG. 1 is a side view of a shank mounting and shank in accordance with the invention, shown attached to a cross frame bar of a cultivator and with the shank elevated as when clearing a major obstruction, and with the frame bar shown sectioned.

FIG. 3 is a front view, taken from the line 3—3 of FIGURE 1, shown with parts broken away.

FIG. 4 is a side view of the shank mounting and shank, shown with the outer casing and the shank broken away.

FIG. 5 is a top view of a shank and the mounting for attachment of the shank on a cross frame bar taken from a line 5—5 of FIGURE 1, shown with parts broken away.

FIG. 6 is a top view similar to the showing in FIGURE 5, but taken from a line 6—6 of FIGURE 2.

FIG. 7 is a side view showing fragments of the outer and inner casings and the shank, and including the attachment for cushioning the upward movement of the shank, including a dashed line showing of the cushioning attachment when the shank is raised and arrows indicating the movement of the working parts.

FIG. 8 is a front view, with parts in section, of the locking bar and the rollers mounted thereon.

Figure 1:
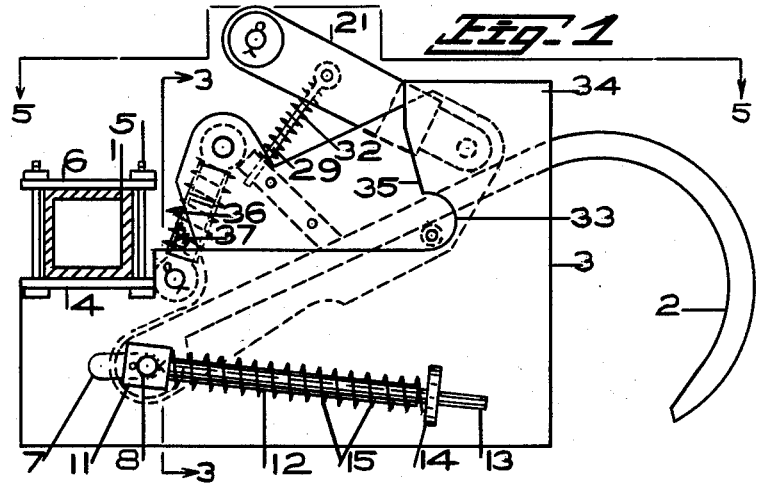

Having reference to the drawings, at 1 is shown a cross frame bar of an implement on which a series of shanks, such as the shank 2, would be carried.

In the present showing the mountings for the shanks would each comprise an outer casing formed of side plates 3 integrally fixed, spaced apart, to the under side of a plate 4 that is attached by bolts 5 to the cross frame bar, the bolts engaging a plate 6 on the upper side of the frame bar.

The side plates 3 have opposing slots 7 forwardly therein (FIG. 1) and in which is transversely disposed a shaft 8 secured by cotter pins, as at 9, and with the shaft free to slide forward and backward in the slots. The shank 2 is formed at its forward end with an integral eye portion 10 engaging the shaft 8 with the shank pivotable on the shaft.

On the shaft 8, outwardly of the side plates 3, are coupling elements 11 to which are fixed tubular bars 12 having rods 13 fixed therein and mounted slidable endwise in lugs 14 fixed to the outer sides of the plates 3. On the bars 12 and rods 13 are coiled springs 15 that normally hold the shaft 8 forwardly in the slots 7 and movable rearwardly against the tension of the springs.

Within the casing formed by the side plates 3 is an inner casing that is formed of side plates 17 forwardly engaging the shaft 8 free to turn thereon. Rearwardly the plates 17 are held spaced apart by a sleeve 18 on a pin 19, and with the shank 2 supported on the sleeve held thereby against downward movement relative to the inner casing.

Pivoted on a pin 20 mounted rearwardly in the inner casing side plates 17 is a locking bar 21 (FIGS. 4 and 8) that includes an integral lug portion 22 at its lower end engaging the pin 20 and a forked upper portion 33 that mounts a pair of rollers 24 on a pin 25 held by cotter pins 26. Fixed in the plates 17 on pins 27 is a stop strap 28 that has a rod 29 slidable in an opening at 30, the rod pivotally attaching in the fork of the locking bar on a pin 31. On the rod 29 is a coiled spring 32 that pushes forward against the locking bar and thereby holds the locking bar with the rollers 24 engageable in semi-circular slots or recesses 33 in the side plates 3 of the outer casing, the side plates (FIG. 1) having upwardly extending portions 34 that incline rearwardly at 35 to guide the rollers into the slots.

Figure 2:
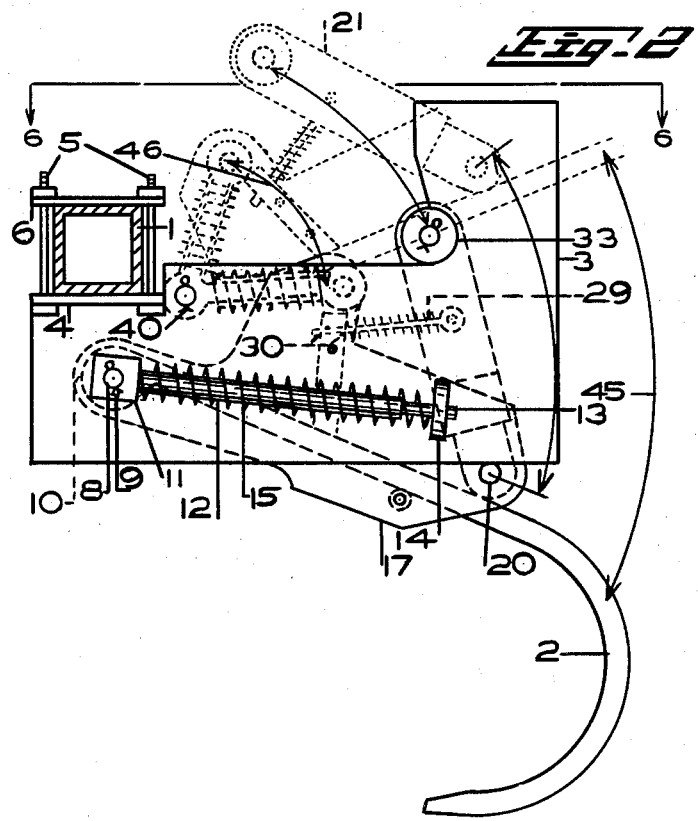
FIG. 2 is a side view similar to the showing in FIGURE 1, but with the shank lowered into soil working position, and the movement of the shank and working parts in the shank mounting indicated in dashed lines.

For cushioning the movement of the shank 2 when it rises a link element has a shank 37 (FIG. 7) with an eye portion 38 engaging a pin 39 transversely mounted in the side plates 3 and held by cotter pins, as at 40 (FIGS. 1 and 2). The shank 37 is slidable in a sleeve 36 in which is slidable a link shank 41 that has an eye portion 42 pivotally engaging a pin 43 transversely fixed in the inner side plates 17. On the sleeve 36 and the shanks 37 and 41 is a coiled spring 44 bearing against the eye portions 38 and 42 and cushioning upward movement of the shank 2.

In the use of the device, the shank 2 normally travels when working as shown in FIGURE 2, in which position the rollers 24 are engaged in the recesses 33 of the side plates 3. By the mounting of the shaft 8 in the slots 7, when a minor obstruction is encountered by a cultivating foot or other soil working element (not shown) carried by the shank, the shank can move rearward against the tension of the two springs 15 while disengaging from the obstruction or turning it aside, the shaft 8 moving in the slots 7. In this position the shank is held against rising by the rollers 24 on the locking bar 21 engaging in the recesses 33, but if a major obstruction is encountered, such as a stone too big or too solidly imbedded to be displaced, continued pressure on the shank disengages the rollers from the recesses 33 and the shank moves upward, as shown in FIGURE 1 and indicated by the arrow 45 in FIGURE 2.

In this movement the shank is stabilized by the link elements formed by the shanks 37 and 41, the springs 44 on the link shanks cushioning the upward movement of the shank, the links moving as indicated by the arrows 46 in FIGURE 7, the offset position of the link pivot pins 39 relative to the shaft 8 on which the shank is mounted produces a forward pressure on the links which is cushioned by the spring 44. When the obstruction is cleared the shank 2 gravitates back to its soil working position.

An important feature of this is that there is no downward pressure on the shank until the obstruction is cleared.

The springs 15 push the shanks forward into working position with the shaft 8 forwardly in the slots 7 when the the shanks are lowered. The pressure required to trip the shanks is approximately the same whether the shank is pulled straight back or on an upward angle. When tripped the shank has a high clearance. In the present showing a two inch rearward movement of the shank before tripping is contemplated.

By this permissible movement of the shank straight back even depth of penetration of soil working elements carried by the shanks is obtained and an even depth of seeding.

What I claim is:

1. In an implement having a cross bar and including a cultivator shank, means mounting the shank on the cross bar to be slidable forward and backward, said means comprising an outer casing including side plates, means attaching the casing on the under side of the cross bar with the side plates depending downward spaced apart, a shaft to which the shank is forwardly pivotally attached movable between a working position in relation to the ground and an elevated position, the casing side plates having slotted openings in which the shaft is transversely mounted to slide forward and backward, an inner casing having side plates forwardly pivotally engaging the shaft, a locking bar, means pivotally attaching the lower end portion of the locking bar between the inner casing side plates with the lower end of the locking bar bearing against the cultivator shank, and rollers mounted on the upper end portion of the locking bar, the outer casing having recesses therein and in which the rollers are engageable with the locking bar held thereby against upward movement, said rollers being disengageable from the recesses by upward pressure on the lock bar.

2. A mounting for a shank as set out in claim 1 and including a rod pivotally attached to the locking bar, a stop strap fixed in the inner casing with said rod slidingly engaged therewith, and spring means on the rod normally holding the locking bar with the rollers thereon engageable in the outer casing recesses.

3. In a cultivator shank as set out in claim 1, link means connected the inner and outer casings cushioning the upward movement of the shank, said link means comprising link elements attached to said casings slidingly engaged and movable to and from each other, and a coiled spring on the link elements opposing movement of said elements together, the attachment of the link to the inner casing being such that upward movement of the shank moves the link elements together.

4. In a mounting for a cultivator shank as set out in claim 1, means transversely mounted in the outer casing side plates below the shank limiting downward movement of the shank in the casing.

5. In an implement having a cross bar, means for mounting a cultivator shank on the cross bar, said means comprising an outer casing having side plates fixedly attached to the under side of the cross bar, a shaft transversely mounted in the side plates, said shank having its forward end pivotally attached on the shaft, an inner casing having side plates pivotally attaching to the shaft, a locking bar mounted pivoted at its lower end portion in the inner casing with the lower end of the locking bar opposing upward movement of the shank, rollers on the upper end of the locking bar, the side plates of the outer casing having recesses in which the rollers are engageable to hold the locking bar against upward movement in the outer casing, spring means anchored in the inner casing and engaging the locking bar to hold said bar with the rollers engageable in the outer casing recesses, and spring actuated link means anchored to the outer casing and engaging the inner casing, said link means cushioning the upward movement of the inner casing.

6. A shank mounting as set out in claim 5 in which the outer casing side plates have elongated slots therein in which the shaft is mounted for the cultivator shank to be movable forward and backward in said casing, and spring means anchored to the outer casing side plates and engaging the shaft opposing backward movement of the shaft in the slots.

References Cited by the Examiner

FOREIGN PATENTS 161,484   11/57   Sweden.

ANTONIO F. GUIDA, *Acting Primary Examiner.*

T. GRAHAM CRAVER, *Examiner.*